United States Patent
Stenmark

(10) Patent No.: US 8,327,865 B2
(45) Date of Patent: Dec. 11, 2012

(54) PRESSURE CONTROLLED GAS STORAGE

(75) Inventor: Lars Stenmark, Trosa (SE)

(73) Assignee: Manbas Alpha AB, Trosa (SE)

( * ) Notice: Subject to any disclaimer, the term of this patent is extended or adjusted under 35 U.S.C. 154(b) by 1173 days.

(21) Appl. No.: 12/066,713

(22) PCT Filed: Sep. 14, 2006

(86) PCT No.: PCT/SE2006/050333
§ 371 (c)(1),
(2), (4) Date: Jul. 25, 2008

(87) PCT Pub. No.: WO2007/032741
PCT Pub. Date: Mar. 22, 2007

(65) Prior Publication Data
US 2008/0283123 A1    Nov. 20, 2008

(30) Foreign Application Priority Data
Sep. 15, 2005  (SE) ....................... 0502036

(51) Int. Cl.
*F17C 13/04* (2006.01)
*F17C 5/06* (2006.01)
*F17C 7/00* (2006.01)

(52) U.S. Cl. ............. 137/15.18; 137/264; 137/266; 137/494; 137/587

(58) Field of Classification Search .......... 137/15.18, 137/15.19, 494, 587, 588, 264, 266; 222/3; 138/41; 141/65, 235, 242
See application file for complete search history.

(56) References Cited

U.S. PATENT DOCUMENTS

| | | | | |
|---|---|---|---|---|
| 2,304,404 A | * | 12/1942 | Flanagan | 137/462 |
| 2,349,137 A | * | 5/1944 | Brown | 137/588 |
| 2,386,958 A | * | 10/1945 | Jackson | 137/588 |
| 2,666,297 A | * | 1/1954 | Skousgaard | 222/3 |
| 3,645,291 A | * | 2/1972 | Finney | 137/588 |
| 3,724,502 A | * | 4/1973 | Hayner et al. | 138/41 |
| 3,744,526 A | * | 7/1973 | MacNiel | 222/3 |

(Continued)

FOREIGN PATENT DOCUMENTS

CN    2568920 Y    8/2003

(Continued)

OTHER PUBLICATIONS

European Search Report, dated Apr. 19, 2011, in EP 06784246.

(Continued)

*Primary Examiner* — John Rivell
(74) *Attorney, Agent, or Firm* — Young & Thompson

(57) ABSTRACT

A gas storage tank (1) has a high pressure resistant shell (10) and a fluid control system (5). The fluid control system (5) has an inlet fluid branch (20) and an outlet fluid branch (30). The inlet fluid branch (20) comprises a check valve (21) and the outlet fluid branch (30) comprises a pressure regulator (32) and a pressure assisted check valve (31). Preferably, the fluid control system (5) also comprises an inlet filter, an outlet filter and flow restriction. The fluid control system (5) is preferably situated entirely on the inside of the high pressure resistant shell (10). The fluid control system (5) is preferably provided as a miniaturized system realized in a stack of bonded wafers, where part devices are formed by micromachined geometrical structures. A method for gas handling with the gas storage tank (1) and a manufacturing method for the gas storage tank (1) are also presented.

16 Claims, 9 Drawing Sheets

U.S. PATENT DOCUMENTS

| | | | |
|---|---|---|---|
| 3,792,714 A * | 2/1974 | Miller | 137/494 |
| 4,660,714 A | 4/1987 | Suzuki et al. | |
| 5,193,580 A * | 3/1993 | Wass et al. | 222/3 |
| 6,089,027 A | 7/2000 | Wang et al. | |
| 6,314,986 B1 * | 11/2001 | Zheng et al. | 137/240 |
| 6,343,476 B1 | 2/2002 | Wang et al. | |
| 6,374,618 B1 | 4/2002 | Lak | |
| 7,150,299 B2 * | 12/2006 | Hertzler et al. | 141/94 |
| 7,216,668 B1 * | 5/2007 | Adams | 137/462 |
| 2002/0124883 A1 | 9/2002 | Zeng et al. | |
| 2004/0123735 A1 | 7/2004 | Watanabe et al. | |
| 2007/0186984 A1 * | 8/2007 | Kimura | 137/588 |

FOREIGN PATENT DOCUMENTS

| | | |
|---|---|---|
| DE | 9210467 U1 | 10/1992 |
| EP | 0 916 891 A2 | 5/1999 |
| EP | 1 180 638 A2 | 2/2002 |
| EP | 1 515 080 A2 | 3/2005 |

OTHER PUBLICATIONS

International Search Report of PCT/SE2006/050333, date of mailing Dec. 12, 2006.

* cited by examiner

PRESSURE CONTROLLED GAS STORAGE

TECHNICAL FIELD

The present invention relates in general to storage of gases, and in particular to storage of gas under high pressure conditions.

BACKGROUND

Hydrogen is a gas that can be used as an efficient fuel as well as for production of electrical energy. The use of hydrogen gas has certain obvious advantages, such as reduced exhaust pollution problems compared to other combustion solutions, and is also a relatively efficient energy storage medium. One of the main obstacles in introducing the hydrogen economy in the society is, however, the difficulties related to physical storage of hydrogen. Requirements on a storage system are a low lifetime cost, high reliability, high safety and simple handling. The possibility to store gas, in particular hydrogen, in a practical manner is therefore a field of great concern.

There are many potential possibilities to store hydrogen gas; in metals as metal hybrids, in carbon nano-tubes, chemically in different solutions or simply in high pressure tanks. There is a lot of ongoing research around the world to find the optimal solution. The challenge is to find a system that meets all or at least most criteria at the same time.

In a typical prior art high pressure tank for storing hydrogen gas, a high pressure shell is provided with an opening for introducing and/or releasing gas. Different kinds of valve configurations are typically provided at the opening for ensuring capability to introduce high pressurized gas into the tank and for ensuring a reliable release of the gas from the tank. The procedures connected to storage and releasing of gas are typically based on physical connection of gas conduits and operation of valves. The valves are typically controlled by physical procedures or by different electrical means.

Frequent handling of valves as well as connection of gas conduits suffer typically from wear and mechanical failures, and since the gas storage has a high pressure in order to reduce the occupied volume, the handling has to be performed with extreme care to avoid accidents.

The problems with gas handling above were above identified concerning handling of hydrogen gas. However, corresponding problems are also present for any kind of gases.

One problem with prior art solutions of gas storage is that the requirements of low lifetime cost, high reliability, high safety and simple handling cannot be met at the same time.

SUMMARY

An object of the present invention is therefore to provide devices and methods for gas storage having improved compromises between the requested requirements. A further object of the present invention is to provide devices and methods for gas storage having reduced needs for physical handling upon filling and releasing gas.

The above objects are achieved by devices and methods according to the enclosed patent claims. In general words, according to a first aspect, a gas storage tank is provided, having a high pressure resistant shell and a fluid control system. The fluid control system has an inlet fluid branch and an outlet fluid branch. The inlet fluid branch comprises a check valve and the outlet fluid branch comprises a pressure regulator and a pressure assisted check valve. Preferably, the fluid control system also comprises an inlet filter, an outlet filter and flow restriction. The fluid control system is preferably situated entirely on the inside of the high pressure resistant shell. The fluid control system is preferably provided as a miniaturized system realised in a stack of bonded wafers, where the check valve, the pressure assisted check valve, the pressure regulator, the inlet filter, the outlet filter and the flow restrictions are formed by micromachined geometrical structures in the stack of bonded wafers.

According to a second aspect of the present invention, a method for manufacturing of a gas storage tank comprises provision of a high pressure resistant shell that has at least one orifice and provision of a fluid control system. The fluid control system has an inlet fluid branch and an outlet fluid branch, where the inlet fluid branch comprises a check valve and the outlet fluid branch comprises a pressure regulator and a pressure assisted check valve. The method further comprises attaching of the fluid control system to cover the orifice. The manufacturing is preferably based on the use of MEMS (Micro Electro Mechanical System) system technology or MST (Micro System Technology).

According to a third aspect of the present invention, a method for handling gas under high pressure comprises a filling phase and a releasing phase. The filling phase comprises exposure of a gas tank for a gas under high pressure, whereby a check valve of an inlet branch of a fluid control system of the gas tank is caused to open by the high pressure. The gas is then filled into the gas tank, and the gas tank is finally removed from the gas under high pressure, whereby said check valve closes. The releasing phase comprises exposure of the gas tank for a first intermediate ambient pressure, whereby a pressure assisted check valve of an outlet branch of a fluid control system of said gas tank is caused to open by said first intermediate pressure. The first intermediate pressure is larger than atmospheric pressure. The gas is thereafter emptied from the gas tank. When appropriate, the releasing preferably also comprises exposure of the gas tank for a second intermediate ambient pressure, which is larger than the first intermediate ambient pressure, whereby a pressure regulator of the outlet branch is caused to close, prohibiting further emptying of gas out from the gas tank.

The invention solves the problem how to store gas in a mass efficient way maintaining the possibility to extract it, in a simple way, when it is needed. The invention is a passive mechanical solution how to store the gas under high or very high pressure. One advantage with the present invention is that the needs for physical procedures upon filling and releasing of gas are reduced, which in turn reduces the risks for mechanical failures as well as reduces the handling times of the gas tanks. Such a simplified handling then also enables the use of smaller tank entities, which in turn improves the safety during handling of the gas.

BRIEF DESCRIPTION OF THE DRAWINGS

The invention, together with further objects and advantages thereof, may best be understood by making reference to the following description taken together with the accompanying drawings, in which.

DETAILED DESCRIPTION

The pressure resistance of a spherical gas storage tank depends mainly on three factors. These factors are the size, the tank material, and the wall thickness. When all factors are considered, it is quite clear that small spheres of metallic or composite material represent a good solution with regard to the relation between the amount of stored gas and the total system mass. However, with a system consisting of many small high pressure tanks a main concern arises; how to tap the gas out from maybe hundreds of small tanks without a very complicated system, resulting in a high cost and a high support system mass. The hereinafter presented invention presents an elegant novel way to solve this.

The solution is based on ambient pressure controlled filling and releasing of each storage tank, removing any need for manual or electrical interaction with valve arrangements. The solution is particularly well suited for small tanks, but may advantageously be applied to any size of gas tanks.

Figure 1:
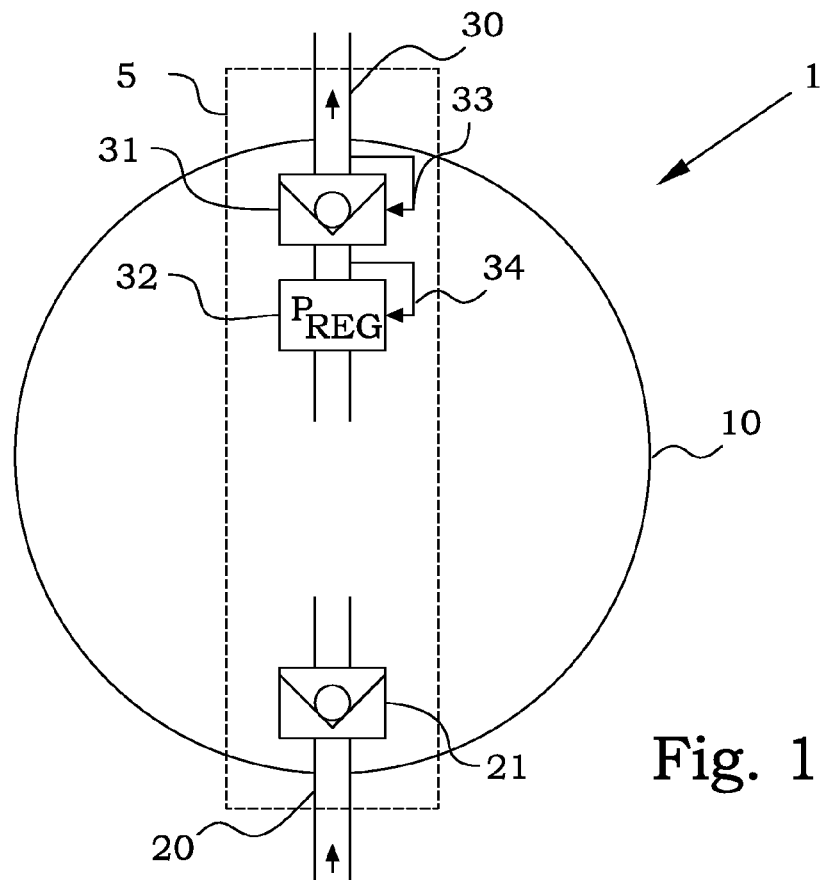
FIG. 1 is a block scheme of an embodiment of a gas tank according to the present invention.

FIG. 1 illustrates a schematic drawing of an embodiment of a tank 1 according to the present invention. According to the present invention, the tank 1 contains its own gas handling system. The tank 1 therefore comprises a pressure resistant shell 10 and a fluid control system 5 having an inlet fluid branch 20 and an outlet fluid branch 30. The inlet fluid branch 20 comprises a check valve 21. The outlet fluid branch 30 comprises a pressure regulator 32 and a pressure assisted check valve 34. Both the pressure regulator 32 and the pressure assisted check valve 34 are controlled by the ambient pressure, as indicated by the arrows 33, 34. The fluid control system 5 thereby permits both filling and releasing of the gas in a controlled way, based on pressure mediated control.

Figure 2:
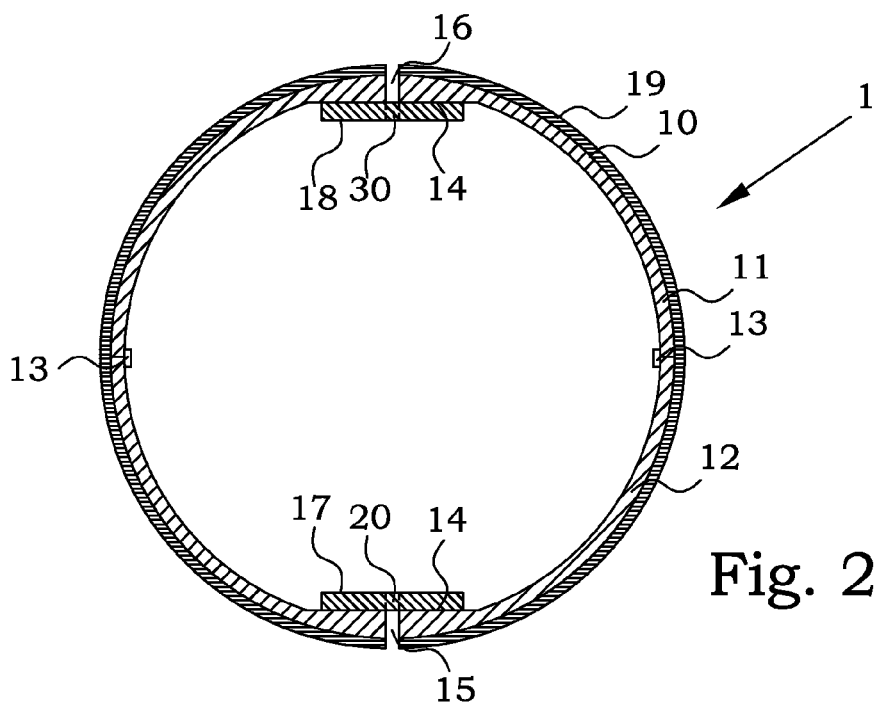
FIG. 2 is a cross-section view of an embodiment of a gas tank according to the present invention.

The tank 1 preferably has the gas handling system, i.e. the fluid control system 5 integrated on the inside. FIG. 2 illustrates a cross-section view of such an embodiment. The pressure resistant shell 10 consists of two inner halves 11, 12, which are attached to each other at flanges 13. The inner halves 11, 12 are coated by fiber composite material, forming an outer part 19 of the shell. In each inner half 11, 12, a portion of the shell 10 is provided with a plane inner surface 14. An inlet hole 15 is provided through the plane inner surface 14 of one tank inner half 11, and an outlet hole 16 is provided through the plane inner surface 14 of the other tank inner half 12. The fluid control system 5 comprises preferably passive micro-mechanical devices working together in small stacks of silicon wafers 17, 18. The stacks 17, 18 are bonded to the plane inner surface 14, covering the inlet hole 15 and the outlet hole 16, respectively.

Figure 3:
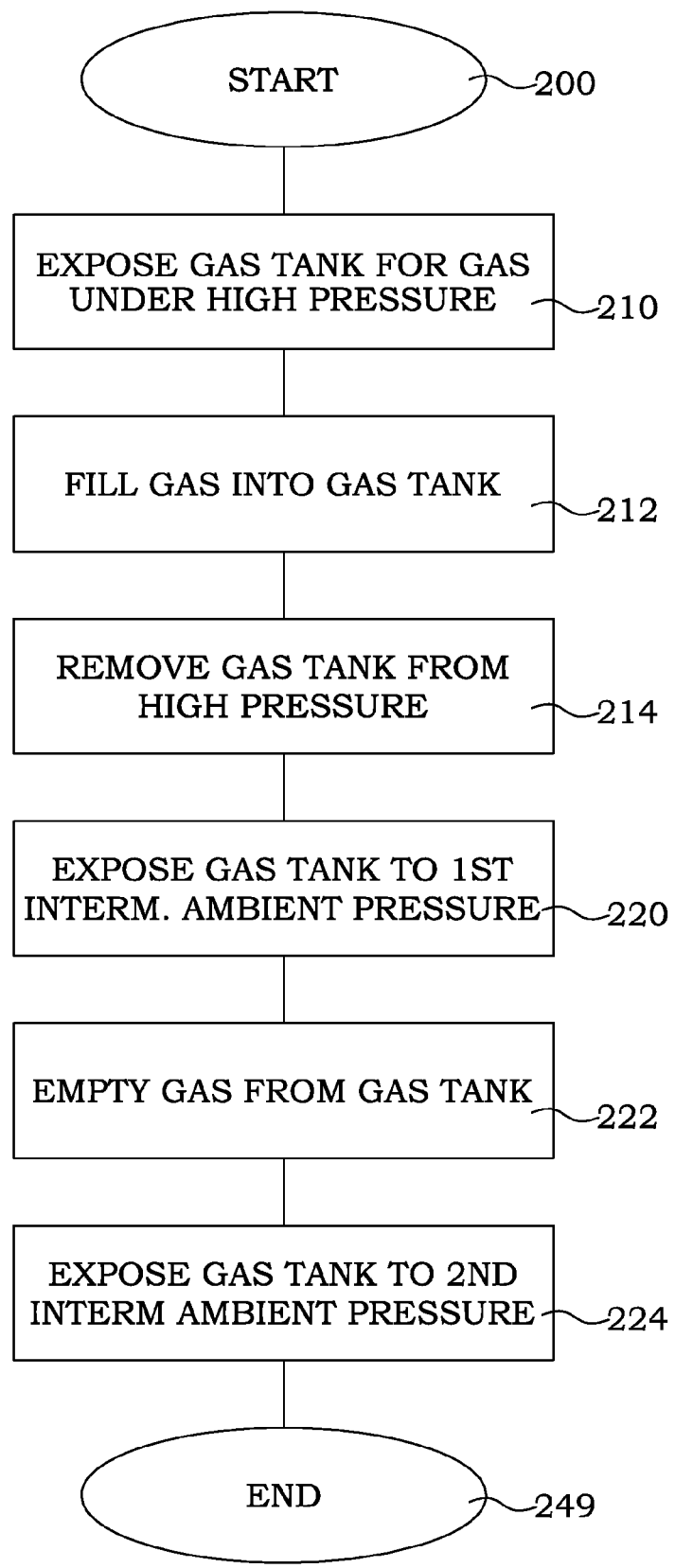
FIG. 3 is a flow diagram of steps of an embodiment of a gas handling method according to the present invention.

FIG. 3 illustrates a flow diagram of main steps of an embodiment of a method for storing gas according to the present invention. The procedure for providing a gas under high pressure starts in step 200, first by filling gas into a gas tank. In step 210, a gas tank is exposed for gas under high pressure. A check valve of an inlet branch of a fluid control system of the gas tank is caused to open by the high pressure. In step 212, the gas is filled into the gas tank. The gas tank is removed from the gas under high pressure in step 214, whereby the check valve closes. The removing can be performed by physically removing the gas tank from the high pressure volume, or by lowering the gas pressure.

It is thus the pressure difference between the ambient pressure and the internal tank pressure that controls the inflow of gas into the tank. When the ambient pressure is higher than the pressure inside the tank, the check valve opens a flow path from the outside to the inside. When the pressure difference decreases, either due to that the pressure inside the tank becomes close to the ambient high pressure or that the ambient pressure is lowered, the check valve closes again.

The release of gas from the tank starts in step 220 by the stop of exposing the gas tank for a first intermediate ambient pressure. This first intermediate ambient pressure causes a pressure assisted check valve of an outlet branch of the fluid control system of the gas tank to open. The first intermediate pressure is larger than atmospheric pressure in order to enable transportation of the gas tank at atmospheric pressures without leaking out gas. In step 222, the gas is emptied from the gas tank. In step 224, the gas tank is exposed for a second intermediate ambient pressure which is larger than said first intermediate ambient pressure and corresponds typically to the operating pressure at which the gas is to be utilized. A pressure regulator of the outlet branch is thereby caused to close, prohibiting further emptying of gas out from the gas tank. The procedure ends in step 249.

The release of gas from the tank is routed over another flow path in the system. In this flow path, the gas has to pass two devices. A first one is a pressure regulator, which reduces the flow to zero if the secondary pressure (the ambient pressure) is exceeding a certain, predetermined limit, i.e. the second intermediate ambient pressure. The maximum secondary pressure is typically depending on the overall application and can be between a few bar up to hundreds of bar. The second device in the outlet flow path is a pressure-controlled valve, which is closed under another given pressure limit. This limit, i.e. the first intermediate ambient pressure, can also be freely chosen, but should typically be a little higher than the normal atmospheric pressure. As mentioned before, this means that the refilled tanks can be transported between the filling station and the consumer without loss of gas.

Figure 4:
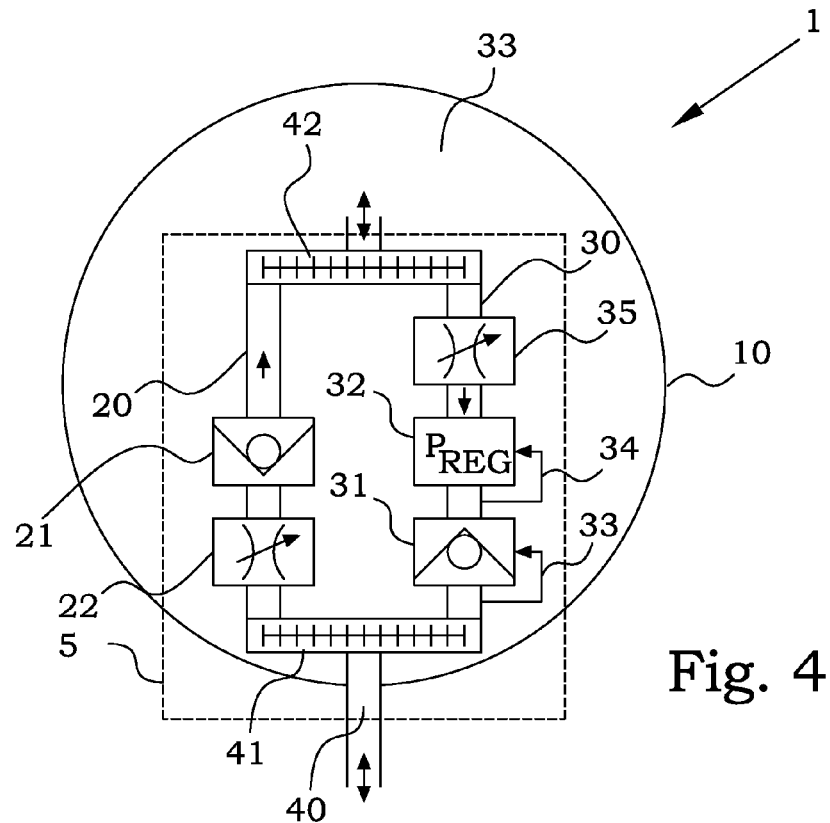
FIG. 4 is a block scheme of another embodiment of a gas tank according to the present invention.

FIG. 4 illustrates a schematic drawing of another embodiment of a tank 1 according to the present invention. In this embodiment, the inlet fluid branch 20 and the outlet fluid branch 30 have a common orifice 40 towards the surroundings of the gas storage tank 1. As in previous embodiment, all gas entering or leaving the tank must pass through the fluid control system 5. Incoming gas flows through the inlet fluid branch 20 and outgoing gas flows through the outlet fluid branch 30. In this embodiment an effective inlet filter 41 on the external side protects the fluid control system 5 from incoming gas particles. A similar outlet filter 42 on the inner side of the tank 1 protects the particle sensitive valve structures of the outlet fluid branch 30 of the fluid control system 5. Between the filter structures 41, 42 the inlet fluid branch 20 and the outlet fluid branch 30 are provided as two separate flow paths, one for gas entering the tank and one for gas leaving the tank. The inlet fluid branch 20 comprises the check valve 21 and in the present embodiment also a flow restriction 22. The flow restriction 22, which alternatively can be a part of the inlet filter structure 41, prevents harmful pressure gradients to build up across the more sensitive check valve 21 during filling procedures. The check valve 21 opens as described briefly above only for gas flow if the external, ambient pressure is at least slightly higher than the internal pressure in the tank 1. If the internal pressure is higher than the external, the check valve 21 completely seals off this inlet fluid branch 20. A possible design solution for the check valve 21 is presented more in detail further below.

The outlet fluid branch 30 contains three devices in serial, a flow restriction 35, a passive mechanical pressure regulator 32 and the pressure assisted check valve 31. The purpose for this second flow restriction 35, which again can be a part of the internal outlet filter structure 42, is to prevent a harmful discharge of gas, in case of a downstream failure. The pressure regulator 32 is a passive mechanical device, which reduces the outlet gas flow to zero when the secondary pressure reaches a certain pre-determined limit, as described above. As the secondary pressure is the same as the ambient pressure, as soon as the pressure assisted check valve 31 opens, it means that when the ambient pressure reaches a maximum working pressure, the tank stops leaking gas. A suitable design of the pressure regulator 32 is presented further below.

The third device in the outlet branch is the pressure assisted check valve 31. This device has an important system function. Without it, the transport of the tank from a filling station to a consumer site would be much more complicated. As our normal atmospheric pressure (1 bar) is much lower than the typical maximum working pressure where the tank seals off automatically, they would empty themselves with a rate limited only by the previously mentioned flow restriction 35. The pressure assisted check valve 31 operates in a manner that can be described as an inverted check valve function, i.e. it is the downstream pressure that opens the valve. The maximum secondary pressure from the pressure regulator can not open the valve itself. A design concept is presented in detail further below.

Figure 5:
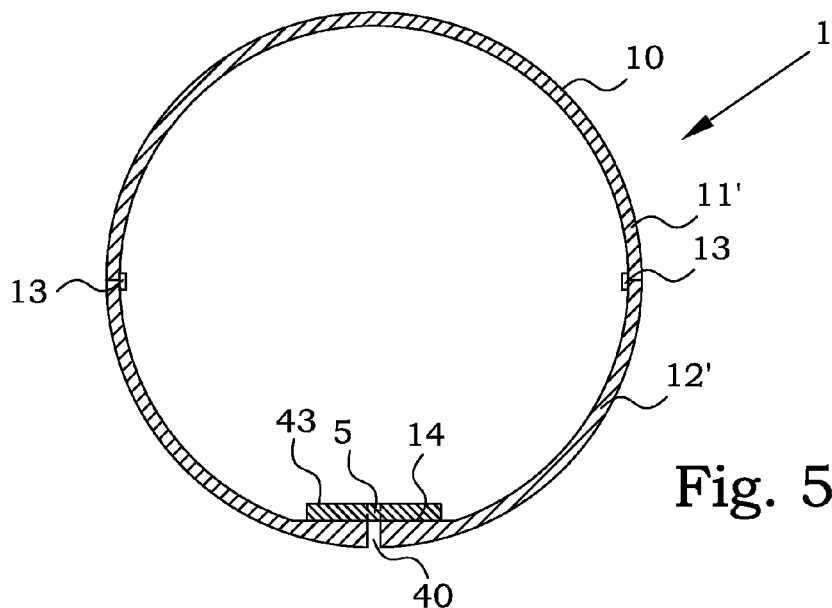
FIG. 5 is a cross-section view of another embodiment of a gas tank according to the present invention.

FIG. 5 illustrates a cross-section view of an embodiment of a tank according to FIG. 4. The tank 1 comprises two halves 11', 12'. In this embodiment, only one of the halves 11' has a hole, used as a part of the common orifice 40. The fluid control system 5 comprises in this embodiment a single small stack 43 of silicon wafers bonded to a flat inner surface 14 of the shell half 11', i.e. mounted leak-tight over the common orifice 40. With the design concepts of the devices comprised in the fluid control system 5 according to the embodiments presented below, five bonded thin silicon wafers can be used to realize the design example. The wafers are typically micromachined and when bonded together they form several passive devices interconnected to a complete micro fluid control system 5.

The tank is in the depicted embodiments drawn as a spherical tank. The spherical shape is advantageous in many applications, but the tank may have any shape suitable for high-pressure systems for gas storage. The intended size (diameter) of the tank of the embodiment of FIG. 5 is in the region of 10 to 50 mm. This allows for the wall thickness to be rather thin, but still allowing relative high gas pressures inside. Furthermore, the stack of micromachined silicon wafers mentioned above provides a suitable fluid control system 5 for this size of tanks. However, as mentioned further above, the principles of the present invention are also advantageously applied to larger tanks.

The shell of the tank should be designed for an appropriate high pressure, e.g. up to 1000 bar. A preferable material choice can be all metallic or of a high strength composite design. However, also other materials are possible to use.

In the embodiments of FIG. 2 and FIG. 5, the fluid control system 5 is situated entirely on the inside of the high pressure resistant shell. This is advantageous in many cases, since the high pressure resistant shell then protects the fluid control system 5 from external mechanical influences. Handling and transporting of the tanks become easier, since there are no protruding parts that may be demolished. However, the basic functional principles according to the present invention are not dependent on this and in a general device, the fluid control system 5, can partly or entirely be placed also outside the high pressure resistant shell.

Figure 6A:
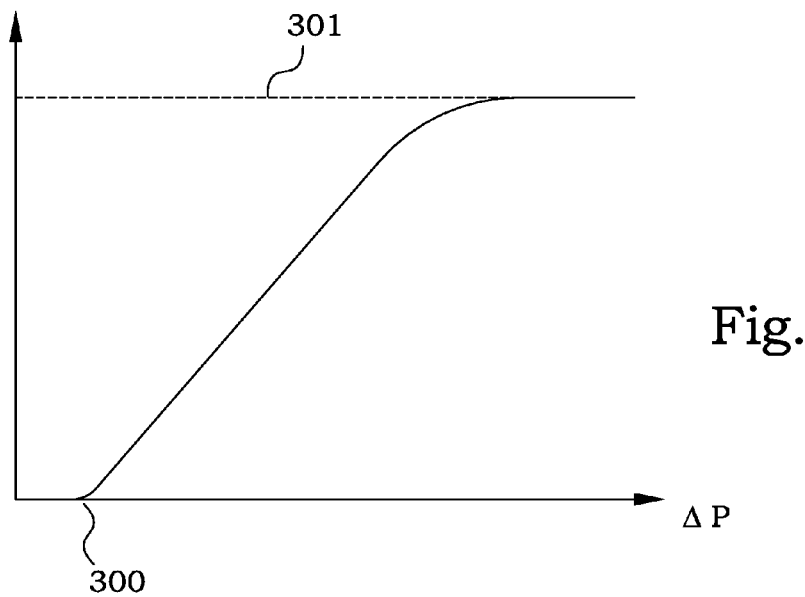
FIG. 6A is diagram giving the fill flow rate versus differential pressure.
Figure 6B:
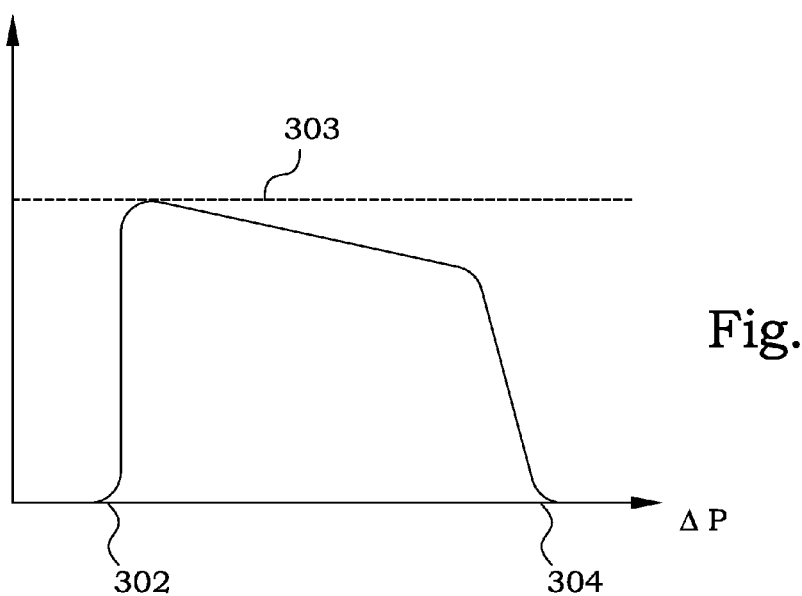
FIG. 6B is diagram giving the drain flow rate versus differential pressure.

The gas flow rate in and out from a tank according to FIG. 5 is depicted in FIGS. 6A and 6B. FIG. 6A illustrates a filling flow rate as a function of the pressure difference over the check valve. At a check valve crack pressure 300, gas starts to flow into the tank, with a rate depending on the pressure difference. The rate changes up to a level 301 where stagnation occurs in the flow restrictor. FIG. 6B illustrates instead the drain flow rate. The internal pressure is now much higher than the external ambient pressure. Below a crack pressure 302 for the pressure assisted check valve, the pressure assisted check valve is closed and the drain flow stopped. Over that limit, gas starts to flow out at a maximum rate 303, slowly decreasing due to reduced pressure difference until the pressure regulator senses the high secondary pressure 304 and stops the flow again.

Further below, detailed embodiments of the devices in the fluid control system 5 are described. The pressure assisted check valve, the pressure regulator, the inlet filter, the outlet filter and the flow restrictions are in these examples formed by micromachined geometrical structures in a stack of bonded wafers. Common for all these embodiments is thus that they are miniaturized systems produced by use of fine mechanics, chemMEMS or MEMS manufacturing methods. It should, however, be noted that manufacturing of devices according to the present invention also can be produced by alternative, conventional, manufacturing methods.

Figure 7:
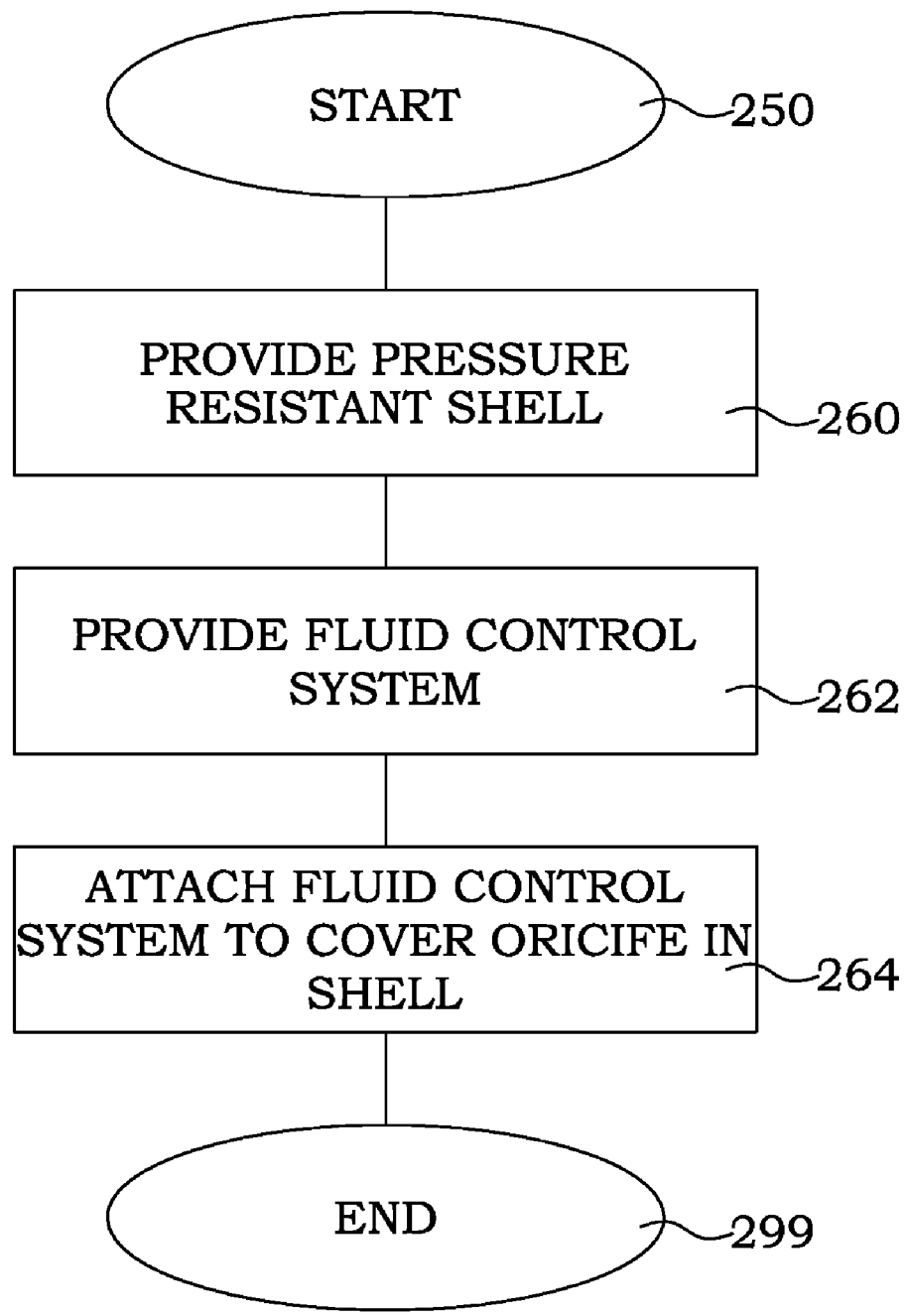
FIG. 7 is a flow diagram of steps of an embodiment of a manufacturing method according to the present invention.

FIG. 7 is a flow diagram illustrating main steps of an embodiment of a manufacturing method according to the present invention. The procedure for manufacturing of a gas storage tank starts in step 250. In step 260, a high pressure resistant shell having an orifice is provided. In step 262 a fluid control system is provided. The fluid control system has an inlet fluid branch and an outlet fluid branch. The inlet fluid branch in turn comprises a check valve and the outlet fluid branch in turn comprises a pressure regulator and a pressure assisted check valve. The step of providing a fluid control system comprises preferably micromachining of a set of wafers into geometrical structures forming the check valve, the pressure regulator and the pressure assisted check valve as well as bonding that set of wafers into a stack of wafers incorporating the check valve, said pressure regulator and said pressure assisted check valve. The micromachining is preferably performed by use of fine mechanics, chemMEMS or MEMS manufacturing methods. The fluid control system is attached to cover the orifice in step 264. The procedure ends in step 299.

A few wafer based embodiments of the fluid control system and part devices thereof are illustrated here below, indicating the vast possibilities for producing passive mechanical devices using e.g. MEMS manufacturing methods. The general protection scope should, however, not be restricted only to these examples, but should only be defined by the enclosed patent claims.

Figure 8A:
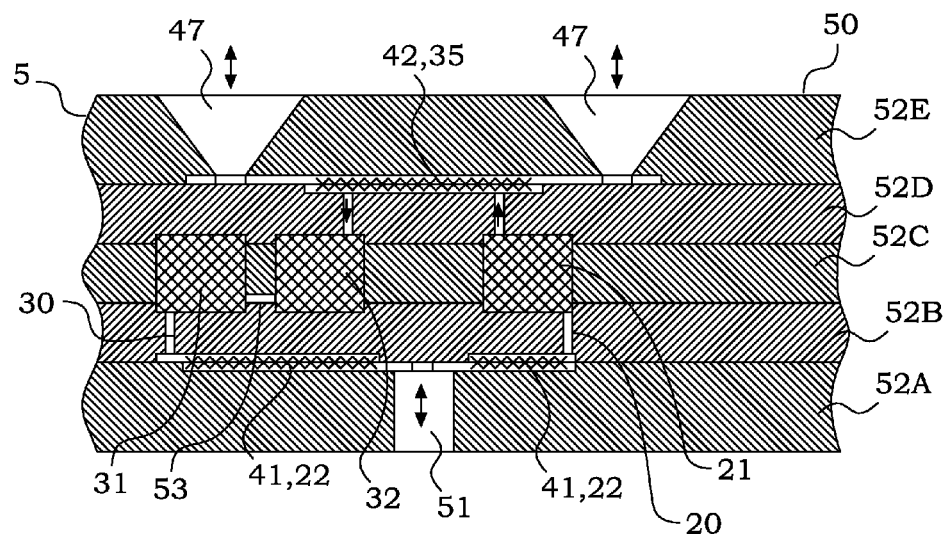
FIGS. 8A and 8B are cross-section views of embodiments of fluid control systems usable in the present invention.

FIG. 8A illustrates a cross-section through a fluid control system 5 implemented in a small wafer stack 50 bonded together and intended to have an inlet hole 51 in registry the entrance hole in the tank. The stack diameter is typically in range of 5-8 mm, with a thickness of 1.5-2 mm for a spherical tank with a diameter of 20 to 50 mm. A larger tank can have a larger fluid control system 5 to give higher fill and drain capacity. The stack 50 consists in this embodiment of five wafers 52A-E. Wafer 52A and wafer 52B can have an increased thickness, to give a mechanically robust system. In the bond interface between wafer 52A and wafer 52B are the external filters 41 formed. The internal filter 42 is integrated in a similar way between wafer 54D and wafer 54E. Wafer 54E is in the present embodiment drawn with more than exit hole 47. Several exit holes 47 could be attractive e.g. for orientation identification purposes. These holes 47 can be anisotropically wet etched in a batch process for a low manufacturing cost.

The three central wafers 54B-D are micro machined on both sides to form micro devices of the fluid control system 5. The pressure assisted check valve 31 is connected to the inlet filter structure 41 and over an internal channel 53 to the pressure regulator 32. The pressure regulator 32 in turn is connected to the outlet filter structure 42. The filling check valve 21 is connected in a similar way between the inlet and outlet filter structures 41, 42. The filter structures 41, 42 operate in the present embodiment also as flow restrictions 35 and 22.

Figure 8B:
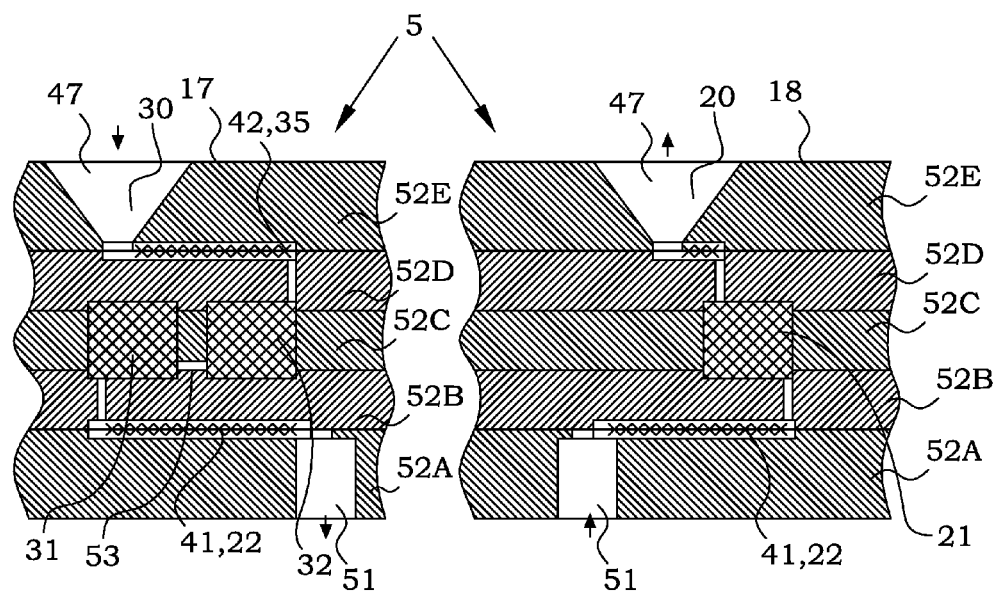

FIG. 8B is a cross section of another embodiment of a fluid control system 5. In this case, the fluid control system 5, comprises two parts, wafer stacks 17 and 18, which are separate wafer stacks forming the fluid inlet branch 20 and the fluid outlet branch 30, respectively. Each wafer stack 17, 18 comprises their own inlet holes 51, and filter structures 41, 42. The implementation of the check valve 21, the pressure regulator 32 and the pressure assisted check valve 31 can be the same as in FIG. 8A.

Figure 9A:
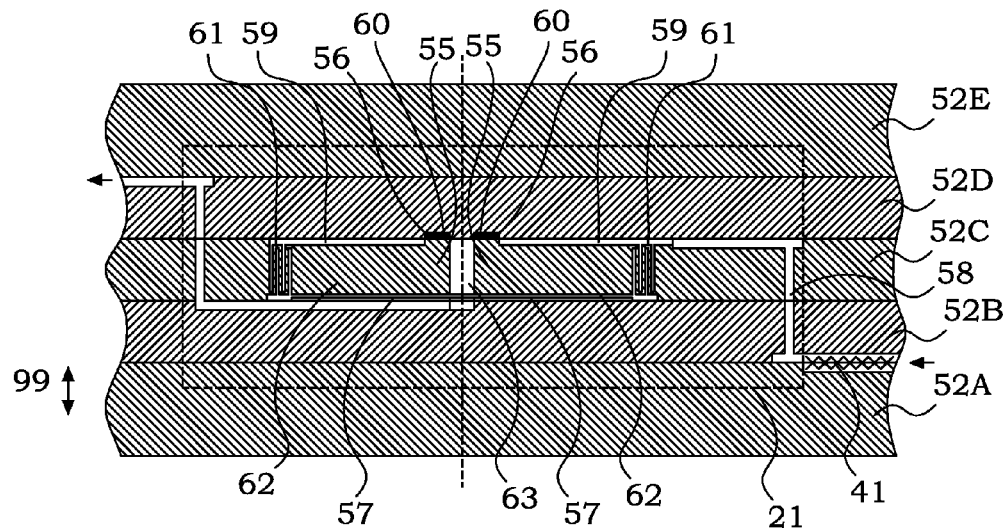
FIGS. 9A and 9B are cross-section views of embodiments of check valves usable in the present invention.

FIG. 9A is a cross section of an embodiment of a check valve 21 that can be used in the present invention. When the gas has passed the inlet filter structure 41 it is transported in a narrow internal transport channel 58, up to the bond interface between wafer 52C and wafer 52D. The transport channel 58 is narrow in order to off-load the mechanical structure from pressure induced stress. The transport channel 58 ends in a circular small volume or cavity 59 in wafer 52C above a valve body 62, which is moveable in axial direction, illustrated by the arrow 99. The valve body 62 is movably spring-suspended by means of a corrugated, pressure-tight membrane 61. When pressure builds up in the cavity 59, the valve body 62 is pushed down opening a slot in a sealing structure 60 around a central hole 63 in the valve body 62. The sealing structure 60 consists in this embodiment of one or several concentrically ridges 55 around the central hole 63. The ridges 55 seal against a valve seat coating 56 in wafer 54D. The valve seat coating 56 is fairly thick, more than 10 microns, which gives a small pre-load, which seals the check valve 21 during equal pressure conditions. The material of the valve seat coating 56 could be a soft metal or a polymer. The actual choice depends on the gas to be stored and the operating pressure range. If the valve body 62 is pushed down until it reaches wafer 52B it will hit an antisticking coating 57 on wafer 52B, preventing it from sticking. Another gas transport channel 57 transports the gas from the central hole 63 to the outlet of the fluid control system 5.

Figure 9B:
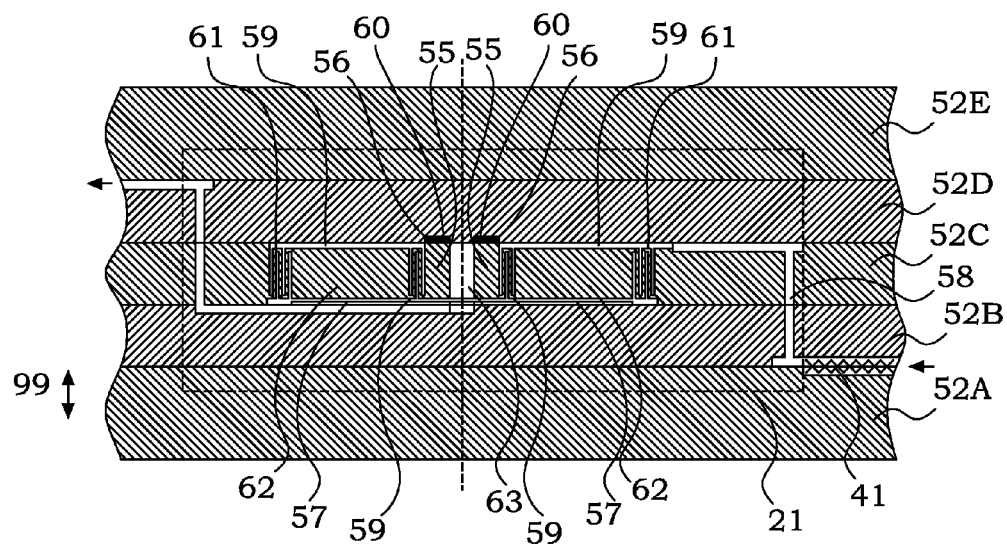

FIG. 9B is a cross section of another embodiment of a check valve 21 that can be used in the present invention. Most parts are the same as in FIG. 9A and are not discussed again. However, an extra protection feature is provided in the present embodiment. When the gas tank is filled and the inlet pressure from the inlet filter structure 41 is removed, the internal pressure inside the gas tank becomes much higher and the valve body 62 is pushed upwards very hard against the valve seat coating 56. A protection spring membrane 59 prevents that the contact pressure at the valve seat coating 56 becomes high enough to damage the seal function. The valve body 62 is thus suspended by two membranes of different diameters. The diameter ratio between the two membranes 59, 61 determines how much the contact pressure is reduced.

Figure 10A:
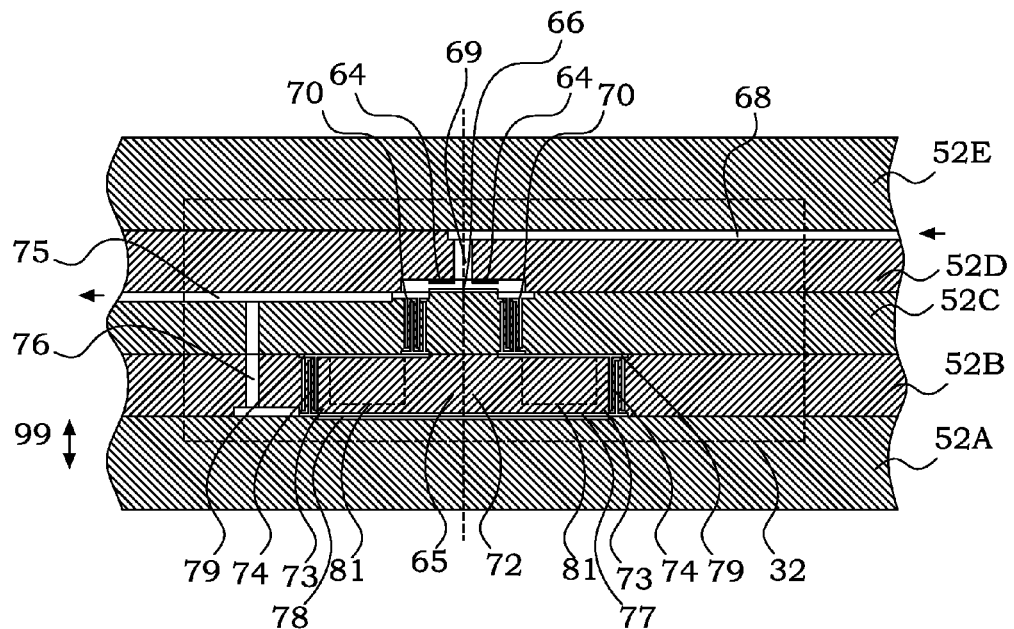
FIGS. 10A and 10B are cross-section views of embodiments of pressure regulators usable in the present invention.

FIG. 10A is a cross section of an embodiment of a pressure regulator 32 that can be used in the present invention. Gas under high pressure comes from the outlet filter structure into a transport channel 68 leading up to a valve feed hole 69, a very narrow hole through wafer 54D. The valve feed hole 69 is surrounded by a valve seat 64. The valve seat 64 can have a suitable hard coating such as TIN or DLC in improve wear resistance. In wafer 52C and wafer 52B, there is a movable valve body 65 formed with a valve cap 66 close to the valve seat 64. The valve cap 66 has also a thin-film coating to give it proper sealing and wear properties.

A flexible but pressure-tight upper membrane 70 in wafer 52C suspends an inner part 72 of the valve body 65. The upper membrane 70 has a relatively small diameter. An outer part 73 of the valve body 65 is suspended in wafer 52B by a large diameter membrane 74. When gas passes the normally open valve it flow through a channel 75 out to the pressure assisted check valve. The gas flows also through a hole 76, through wafer 52C and wafer 52B, down to an actuator volume 77 under the valve body 65. If the valve body 65 is under low secondary pressure, i.e. the pressure downstream the pressure regulator 32, it is pressed against an antisticking coating 78 on wafer 52A. The force that presses down the valve body 65 is a combination of spring tension in upper membrane 70 and the large diameter membrane 74 and the gas pressure in a cavity 79. The cavity 79 can have a larger volume if some material 81, indicated by the broken line, is removed from the outer part 73 of the valve body 65. When the pressure in the actuator volume 77 increases, the valve body 65 leaves the antisticking coating 78 surface at a certain point and starts to move upwards, gradually closing the pressure regulator 32 until, finally the valve cap 66 hits the valve seat 64. When the pressure regulator 32 then closes, the pressure increase in the actuator volume 77 stops. When pressurized gas leaves the system, the pressure drops and the pressure regulator 32 opens again, whereby the pressure regulating cycle starts all over again.

Figure 10B:
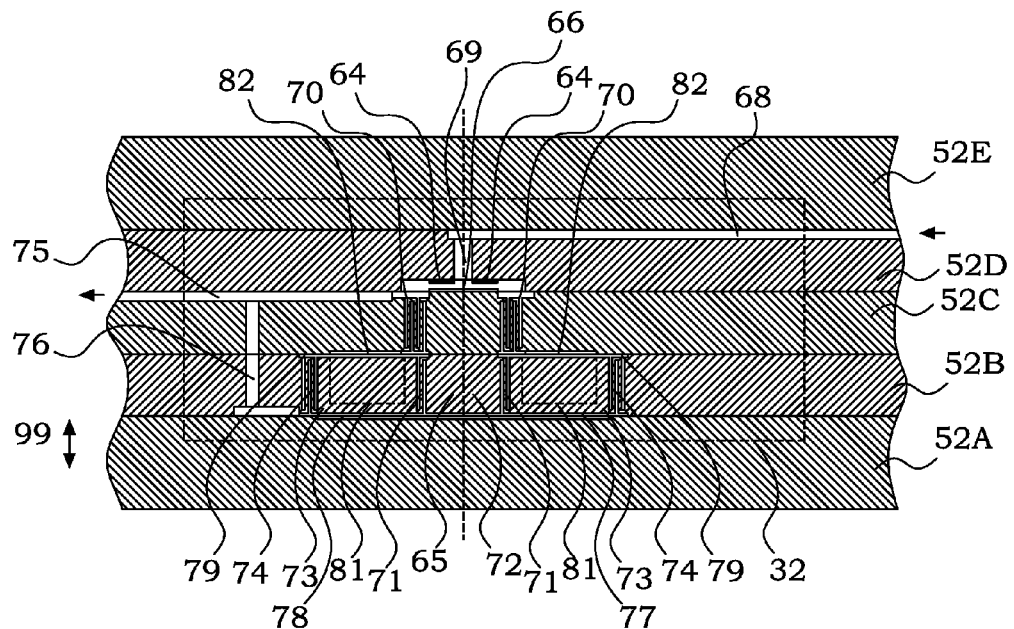

FIG. 10B is a cross section of another embodiment of a pressure regulator 32 that can be used in the present invention. Most parts are the same as in FIG. 10A and are not discussed again. However, an extra protection feature is provided in the present embodiment. A very small membrane 71 in the lower part in wafer 52B with a limited flexibility constitutes a flexible link between the valve body inner part 72 and the outer part 73. The reason for this arrangement is to prevent excessive contact pressure on the pressure regulator 32 if the regulator is exposed to high back-pressure. During the procedure of filling tanks with high-pressure gas, the pressure assisted check valve opens and gas flows backwards into the system increasing also the pressure in the actuator volume 77 to a high level. This pressure brutally pushes up the valve body 65, which closes the pressure regulator 32. Further, the pressure pushes also the outer part 73 of the valve body 65 against an antisticking coating 82 on wafer 52C. The spring function of the small membrane 71 thus prohibits extensive contact pressure in the valve seat 64, something that might damage the sealing surfaces.

Figure 11:
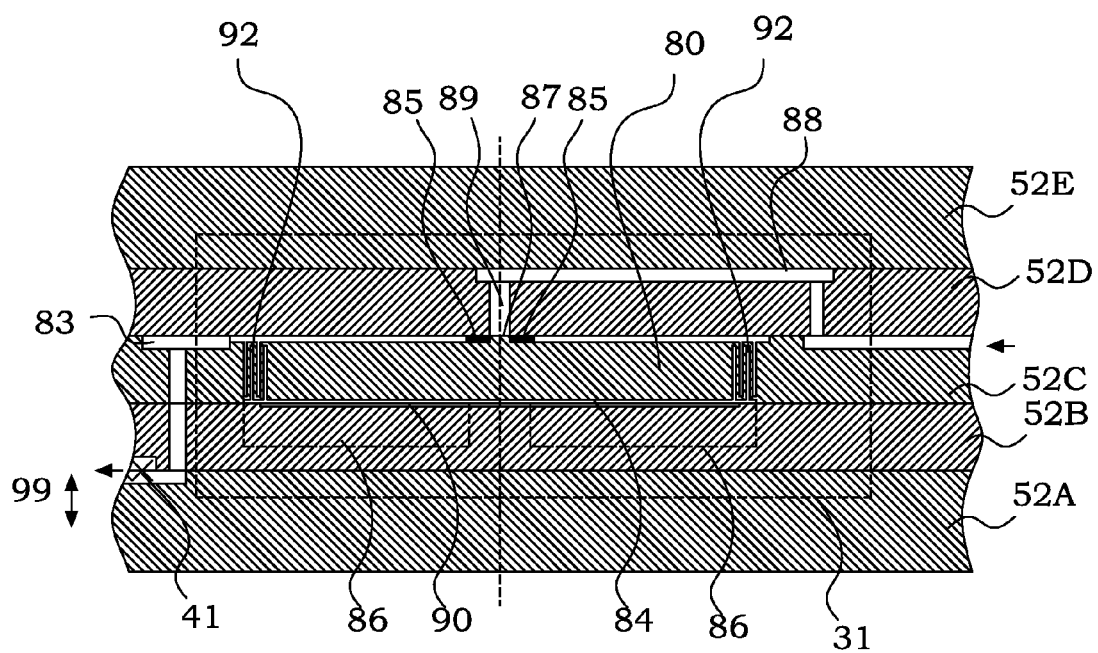
FIG. 11 is a cross-section view of an embodiment of a pressure assisted check valve usable in the present invention.

FIG. 11 is a cross section of an embodiment of a pressure assisted check valve 31 that can be used in the present invention. When an external ambient pressure sensed of the system, e.g. through a filter structure 41 and through a transport channel 83, is low, the pressure assisted check valve 31 closes. The reason is that a pressure in a reference volume 84 is higher than the external ambient pressure and the pressure difference pushes up a valve body 80 against a valve seat 85. The valve body 80 is suspended in a membrane 92, allowing the valve body 80 to be displaced smaller distances. By removing material 86, indicated by the broken line, from wafer 52B, the reference volume 84 can be further increased. Gas having a secondary pressure, coming from the pressure regulator, enters the pressure assisted check valve 31 through a channel 88. The gas enters through a narrow hole 89 in wafer 52D down to the valve body 80. A force is generated on a small area 87 of the valve body 80 that is in contact with the secondary pressure. However, this force is typically too small to open the pressure assisted check valve 31 on its own. To open the pressure assisted check valve 31, it is required that the external pressure is above a certain level, where it together with the secondary pressure can push down the valve body 80. As soon as the pressure assisted check valve 31 opens, gas starts to flow through it until the external pressure essentially equals the secondary pressure. During the filling procedure, when the external pressure is very high, the valve body 80 is pushed against an antisticking coating 90 on wafer 52B and the pressure assisted check valve 31 is fully open.

The embodiments described above are to be understood as a few illustrative examples of the present invention. It will be understood by those skilled in the art that various modifications, combinations and changes may be made to the embodiments without departing from the scope of the present invention. The detailed design of the devices of the fluid control system 5 can e.g. be modified by anyone skilled in the art of MEMS, without changing the basic functionality. Also, different part solutions in the different embodiments can be combined in other configurations, where technically possible. The scope of the present invention is, however, defined by the appended claims.

The present invention enables gas to be stored under high pressure preferably in many small, from each other independent, spherical tanks. Each tank contains preferably an integrated micro system, the micro system permits filling and releasing of gas in an autonomous way, wherein the only control parameter needed is the external pressure. The system is passive and requires no electrical or thermal energy to operate. The micro system can preferably be formed by bonding a number of micro machined silicon wafers together. Such manufacturing technology enables a mass production of the system, resulting in a low unit cost. This in turn yields an acceptable total cost for a complete storage system. The splitting of the total amount of stored gas in many small tanks contributes also to a reduced risk for dangerous tank rupture in case of a failure.

The invention claimed is:

1. A gas tank, comprising:
a high pressure resistant shell; and
a fluid control system having an inlet fluid branch and an outlet fluid branch;
said inlet fluid branch in turn comprising a check valve; and
said outlet fluid branch in turn comprising a pressure regulator and a pressure assisted check valve,
wherein said fluid control system is a miniaturized system realised in a stack of bonded wafers.

2. A gas tank according to claim 1, wherein said inlet fluid branch and said outlet fluid branch have a common orifice towards the surroundings of the gas tank.

3. A gas tank according to claim 1, wherein said inlet fluid branch further comprises an inlet filter.

4. A gas tank according to claim 1, wherein said outlet fluid branch further comprises an outlet filter.

5. A gas tank according to claim 1, wherein at least one of said inlet fluid branch and said outlet fluid branch further comprises a flow restriction.

6. A gas tank according to claim 5, wherein said flow restriction is combined with a filter.

7. A gas tank according to claim 1, wherein said fluid control system is situated entirely on the inside of said high pressure resistant shell.

8. A gas tank according to claim 1, wherein at least one of said check valve, said pressure assisted check valve, said pressure regulator, said inlet filter, said outlet filter and said flow restrictions are formed by micromachined geometrical structures in said stack of bonded wafers.

9. A gas tank according to claim 8, wherein at least one of said check valve, said pressure assisted check valve and said pressure regulator comprises a membrane suspended moveable valve body.

10. A gas tank according to claim 9, wherein a part of said membrane suspended moveable valve body of said pressure regulator is suspended by two membranes of different diameters.

11. A gas tank according to claim 1, wherein said high pressure resistant shell is made of a metal or a composite material.

12. A gas tank according to claim 1, wherein said high pressure resistant shell has a substantially spherical shape.

13. A method for manufacturing of a gas tank, comprising the steps of:
providing a high pressure resistant shell having an orifice;
providing a fluid control system;
said fluid control system having an inlet fluid branch and an outlet fluid branch;
said inlet fluid branch in turn comprising a check valve; and
said outlet fluid branch in turn comprising a pressure regulator and a pressure assisted check valve; and
attaching said fluid control system to cover said orifice,
wherein said step of providing a fluid control system in turn comprises the steps of:
micromachining a set of wafers into geometrical structures forming said check valve, said pressure regulator and said pressure assisted check valve, and
bonding said set of wafers to a stack of wafers incorporating said check valve, said pressure regulator and said pressure assisted check valve.

14. A method according to claim 13, wherein said step of micromachining is performed by use of fine mechanics, chemMEMS or MEMS manufacturing methods.

15. Method for storing gas under high pressure, comprising the steps of:
exposing a gas tank for gas under high pressure;
whereby a check valve of an inlet fluid branch of a fluid control system, being a miniaturized system realised in a stack of bonded wafers, of said gas tank is caused to open by said high pressure;
filling said gas into said gas tank;
removing said gas tank from said gas under high pressure;
whereby said check valve closes;

exposing said gas tank for a first intermediate ambient pressure, said first intermediate ambient pressure being ambient with respect to said gas tank including any fluid control system;

whereby a pressure assisted check valve of an outlet fluid branch of said fluid control system of said gas tank is caused to open by said first intermediate ambient pressure;

said first intermediate pressure being larger than atmospheric pressure; and emptying said gas from said gas tank.

16. Method according to claim 15, comprising the further step of exposing said gas tank for a second intermediate ambient pressure;

said second intermediate ambient pressure being larger than said first intermediate ambient pressure;

whereby a pressure regulator of said outlet fluid branch is caused to close, prohibiting further emptying of gas out from said gas tank.

* * * * *